United States Patent
Singh et al.

(10) Patent No.: US 8,924,363 B2
(45) Date of Patent: Dec. 30, 2014

(54) SEMANTICS MISMATCH IN SERVICE INFORMATION

(71) Applicant: GM Global Technology Operations LLC, Detroit, MI (US)

(72) Inventors: Satnam Singh, Bangalore (IN); Sachin Raviram, Bengaluru (IN); Keith D. Armitage, Canton, MI (US); Steven W. Holland, St. Clair, MI (US); Frederick J. Vondrak, Novi, MI (US); David N. Nowak, Warren, MI (US); David B. Miller, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/670,560

(22) Filed: Nov. 7, 2012

(65) Prior Publication Data

US 2014/0129528 A1 May 8, 2014

(51) Int. Cl.
*G06F 17/30* (2006.01)
(52) U.S. Cl.
USPC ............... 707/690; 707/780; 715/271; 704/7
(58) Field of Classification Search
CPC .. G06F 17/273; G06F 17/30286; G06F 9/466
USPC ......... 707/690, 705, 728, 729, 730, 731, 749, 707/758, 767, 780, 607, 608; 715/255, 257, 715/259, 261, 268, 271, 258; 704/7
See application file for complete search history.

(56) References Cited

U.S. PATENT DOCUMENTS

| 5,642,522 A * | 6/1997 | Zaenen et al. ............... 715/246 |
| 8,204,874 B2 * | 6/2012 | Wei et al. ..................... 707/713 |
| 2007/0156622 A1 * | 7/2007 | Akkiraju et al. ............... 706/48 |
| 2009/0326917 A1 * | 12/2009 | Hegenberger .................... 704/7 |
| 2011/0208769 A1 * | 8/2011 | Kemp .......................... 707/769 |

OTHER PUBLICATIONS

Galli et al., An Automatic Dictionary and the Verification of Machine-Readable Text, IBM Systems Journal, vol. 6, Issue 3, Digital Object Identifier: 10.1147/sj.63.0192, Publication Year: 1967, pp. 192-207.*

* cited by examiner

*Primary Examiner* — Greta Robinson

(57) ABSTRACT

A method for correcting service manual textual inconsistencies. Extracting textual procedures from service documents stored in a memory of a service document storage device. Each term of an extracted textual procedure terminology is compared to a correlating target name terminology for identifying any matching terms by a processor. An overlap similarity is computed as a function of the identified matching terms from the extracted textual procedure terminology and the correlating target name terminology. A determination is made whether the overlap similarity is greater than a predetermined similarity threshold. The service documents are modified to change the extracted textual procedure terminology to the correlating target name terminology in response to the overlap similarity being greater than the predetermined similarity threshold and the extracted textual procedure terminology not exactly matching the correlating target name terminology.

19 Claims, 2 Drawing Sheets

SEMANTICS MISMATCH IN SERVICE INFORMATION

BACKGROUND OF INVENTION

An embodiment relates generally identifying mismatches of terminology in the service repair procedures.

Service repair procedures are used by service technicians to diagnose and repair vehicles. The repair procedures include various diagnostic documents and diagnostic procedures for diagnosing and repairing systems, subsystems, and components. Both diagnostic procedures and repair procedures are written by engineers or technical experts. Numerous personnel are used to draft the various procedures. Even for subsystems that are closely related, different personnel may draft diagnostic and service procedures. Typically, the systems, subsystems, and components that are described in the procedures may be identified using a word, a string of words, an identifier, a code, a numeric code, an alphanumeric code, or a combination of the above. The issue is that since various personnel are drafting the procedures, there may be inconsistent use of terminology between the different procedures. This may cause confusion for the service technicians servicing the vehicles when trying to comprehend the procedures. As a result, an inconsistent naming of components and the like will lead to incorrect repairs, wasted time, and money spent on repairing a vehicle.

SUMMARY OF INVENTION

An advantage of an embodiment is an automated verification of identifying inconsistencies in service document terminology. The system automatically extracts service procedure terminology from a memory storage unit and compares the extracted terminology to a list of target terminology for determining whether the procedure relates to similar components or parts. A comparison of the terminology is thereafter performed for identifying inconsistencies between the extracted service procedure terminology and the target terminology. Inconsistencies and missing terms are corrected for making terminology within the service procedures consistent.

An embodiment contemplates a method of correcting service manual textual inconsistencies. Textual procedures are extracted from service documents stored in a memory of a service document storage device. Each term of an extracted textual procedure terminology is compared to a correlating target name terminology for identifying any matching terms by a processor. An overlap similarity is computed as a function of the identified matching terms from the extracted textual procedure terminology and the correlating target name terminology. A determination is made whether the overlap similarity is greater than a predetermined similarity threshold. The service documents are modified to change the extracted textual procedure terminology to the correlating target name terminology in response to the overlap similarity being greater than the predetermined similarity threshold and the extracted textual procedure terminology not exactly matching the correlating target name terminology.

An embodiment contemplates a service document detection system for correcting textual inconsistencies in service documents. A memory storage device stores part name data relating to service documents. A processor extracts textual procedure terminology from service documents in the memory storage device. The processor compares each term in the extracted textual procedure terminology to a correlating target name terminology for identifying any matching terms. The processor computes an overlap similarity as a function of the identified matching terms from the extracted textual procedure terminology and the correlating target name terminology. The processor determines whether the overlap similarity is greater than a predetermined similarity threshold. A modification is made to the service documents to change the extracted textual procedure terminology to the correlating target name terminology in response to the overlap similarity being greater than the predetermined similarity threshold and the extracted textual procedure terminology not exactly matching the correlating target name terminology.

DETAILED DESCRIPTION

Figure 1:
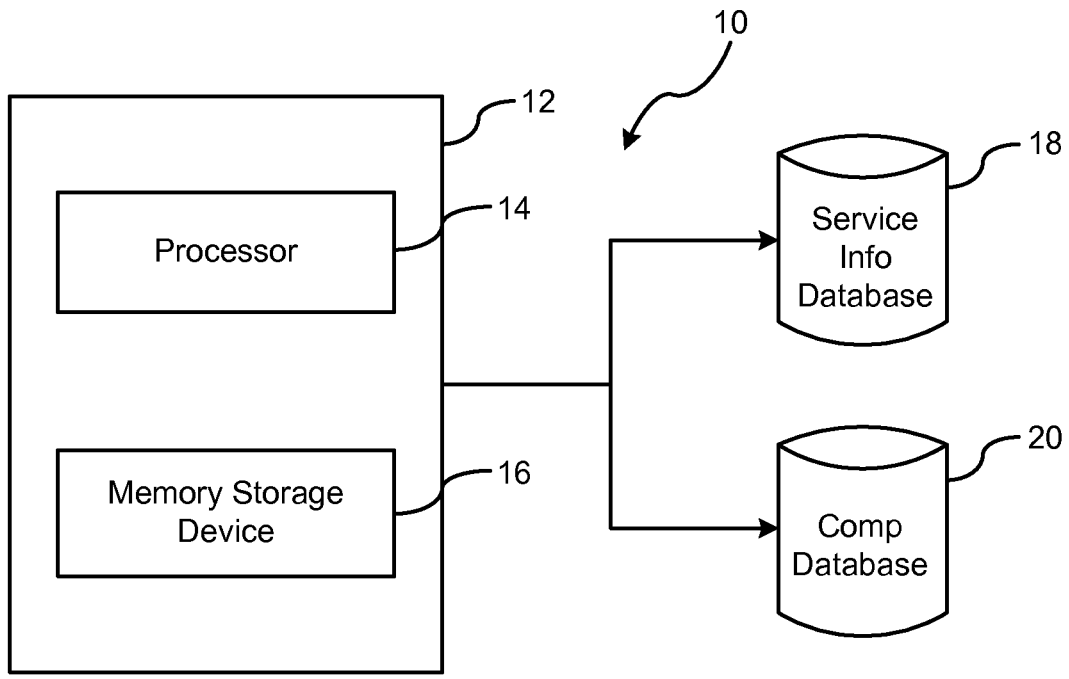
FIG. 1 is a block diagram of a service database mining system.

There is shown in FIG. 1 service database mining system 10 for finding textual inconsistencies in service information. The system 10 utilizes semantics analysis for detecting the textual inconsistencies in the service information. A server 12 includes a microprocessor 14 and a memory storage device 16. The microprocessor 14 is a multipurpose, programmable device that receives input digital data, processes it according to readable instructions that are stored in its internal memory, and generates an output signal in accordance with the analyzed data and readable instructions. The microprocessor 14 may also utilize the memory of the memory storage device 16 that is external to the microprocessor 14 for temporarily storing data that is used by the microprocessor. The microprocessor 14 as will be discussed later receives service document data and performs a lexical similarity matching between target terms and the document being analyzed.

The system 10 further includes a service information database 18 and a comparison database 20. The service information database 18 includes service documents. The service documents may include a single document or a multiple service documents. The documents are service diagnostic procedures or service repair procedures that are retrieved from the service information database for finding semantic mismatches in the service documents.

The comparison database 20 includes a list of terms that are proper names of terms used by in the service documents. These terms include a set of names of what something should be called so they can be compared to the service documents in the service information database. The terms may include a word, a string of words, an identifier, a code, a numeric code, an alphanumeric code, or a combination terms. The comparison database 20 also includes a list on terms that have lexical similarity. For example, the term "tire" may be the target terms and similar names may be used in documents that have a lexical similarity such as "left front", "spare", or "inflator".

Figure 2:
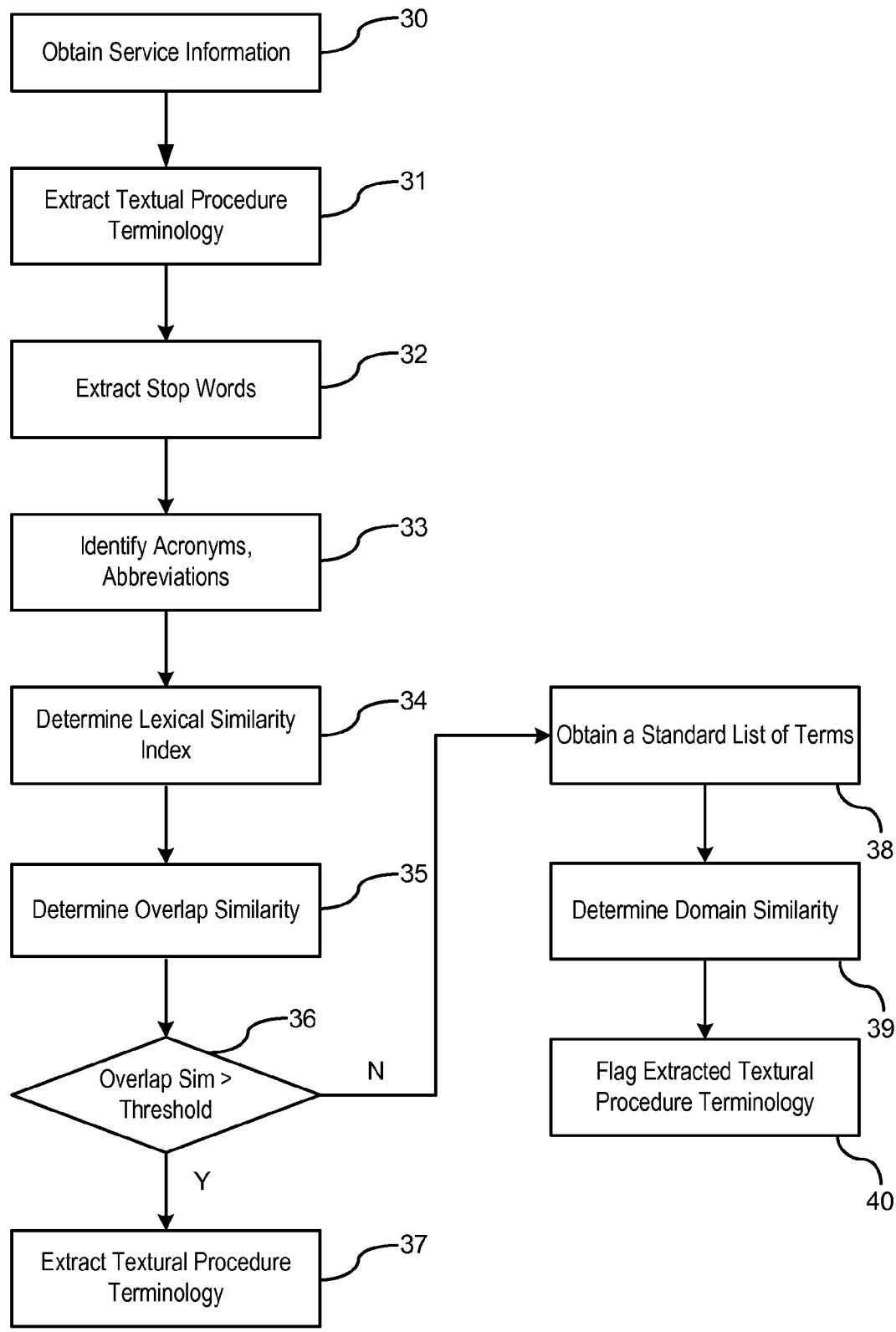
FIG. 2 is a flowchart for performing the semantic similarity technique on the service documents.

FIG. 2 illustrates a flowchart for performing the semantic similarity technique on the service documents.

In step 30, service information is obtained from the service documents. The service information includes service diagnostic procedures and service repair procedures. The service information is placed into a respective format (such as Excel®) such that the server knows which fields to obtain information from. The service information is initially stored in the service database and is formatted in the respective format.

In step 31, diagnostic rules are applied to extract textual procedure terminology from the service information obtained in step 30. The diagnostic rules may identify terms that relate to a component, a diagnostic trouble code, or parameter identification data. For example, a first exemplary term may relate to component names or part names. Identification of component names or part names is performed by parsing through all the sections in each "Document ID" which is typically a unique identifier number assigned to each respective diagnostic procedure in the service information. Examples of terms that contain component or part names include, but are not limited to, "replace the <part name>", "inspect the <part name>", etc.

A second exemplary term may relate to a diagnostic trouble code (DTC) and a description. This is identified by parsing through each document ID to locate a DTC descriptor section/tag. A DTC name and a description for the respective document ID follow this respective tag.

A third exemplary term may relate to a fastener name. It should be understood that the terms as identified herein are only exemplary and the list is not an exhaustive listing of terms. Fastener names are identified from document IDs that are titled "Fastener Specifications" or similar. The term fastener simply implies that your typical types of bolts or other fasteners are used to fasten mechanical parts.

Each of the respective exemplary terms identified in step 31 are identified as a first list along with the associated document IDs from where they were selected.

In step 32, stop words are removed from the extracted documents. Stop words add unnecessary noise in the data while performing natural language processing of the data. Stop words consist of, but are not limited to, "a", "an", "the", "who", "www", "because", and "becomes", which are considered to be non-descriptive. A stop word list may be stored in either a memory of the server, the service database, the comparison database, or another respective database or memory. Stop words identified in the stop word list that are part of the extracted information are removed.

In step 33, all acronyms, in addition to abbreviations, are identified and are converted to an expanded form using an acronym/abbreviation list. The acronym/abbreviation list may be stored in either a memory of the server, the service database, the comparison database, or another respective database or memory. Examples of acronyms include the PCM and ECM. PCM is expanded to "powertrain control module" or EV is expanded to "electric vehicle". After this pre-processing step such as removing stop words and spelling out abbreviations and acronyms, the list is refined and re-labeled as a second list.

In step 34, a lexical similarity index ($Sim_L$) is determined for all the identified items contained in the second list. Only those terms are retained that contain the target words of the correct terminology. For example, if the appropriate terminology is "hybrid/EV powertrain control module 2", then only those terms that contain the word "module", "control", "powertrain" are retained. Retained terms that have a correlation to the target terms have a $Sim_L=1$. Retained words are identified in a third list. The goal is to remove parts such as signal circuits, switches, relays, etc. If a term has an identified correlation of $Sim_L=1$, then the routine proceeds to step 35. Terms that have no correlation to one another have a $Sim_L=0$. Terms that are identified as $Sim_L=0$ are ignored.

In step 35, an overlap similarity $Sim_O$ is determined. In step 36, a determination is made whether the $Sim_O$ is greater than a predetermined threshold. This is performed by comparing each element in the third list with all the other elements in that list. The following formula is used to compute the $Sim_O$:

$$Sim_O = \frac{|T \cap C|}{\text{Max}|T||C|}$$

where T includes the target terminology representation for the textual procedure terminology, C includes the extracted textual procedure terminology from the service documents, $T \cap C$ is an overlap of terms between the target terminology representation and the extracted textual procedure terminology, and Max|T||C| is the maximum number of matching terms possible between the target terminology representation and the extracted textual procedure terminology.

This step identifies the different ways in which a certain part has been named within the entire service documents. For example, there are parts in third list that are labeled "K9 Body Control Module", "K9 Body Control", and "Body Control Module K9", this step will identify the similarity between these three variations.

If for example the predetermined threshold was 0.75, then a $Sim_O \geq 0.75$ would indicate that the extracted textual procedure terminology representation is very similar to the target terminology. As a result, the routine would proceed to step 37. If $Sim_O \leq 0.75$, then this indicates that the parts are two different parts, and the routine proceeds to step 38 which is to ensure that each part name in the third list conforms to a standard naming convention for each part which is "Part Code" followed by "Standard Part Description". For example, the element "K9 Body control Module" is a valid name where "K9" is the Part Code and "Body Control Module" is the standard part name.

In step 37, the extracted textual procedure terminology in the service document is flagged for revision if the textual content of the extracted textual procedure terminology is not identical to the target terminology. A respective person responsible for editing the service procedure will receive the identified document with the flagged extracted textual procedure terminology and will modify the document so that the extracted textual procedure terminology recites exactly the target terminology.

To determine the $Sim_D$, a standard list of terms are obtained in step 38. In step 39, a domain similarity $Sim_D$ is computed. The standard list of terms includes terms that relate to a component, a diagnostic trouble code, or parameter identification data as described earlier. The standard list of terms includes standard component codes and their standard component names. For each element in the third list, the first word (which is assumed to be the component code) is compared with the first word of each element in the standard list. If a match is present, then this indicates that a component code is present. Next, a comparison is made with the remaining words of the element in the third list with elements in the standard list that shares the same component code. If there is a discrepancy, the element is flagged as a remaining description that does not match the standard name.

In step 39, if no match that is present in regards to the component code, then the element is flagged as textual procedure terminology that does not have a component code. Another check is performed to determine if the textual procedure terminology that is missing the component code is at least named correctly per the standard naming scheme. The $Sim_D$ is determined by comparing the standard list of terms with the extracted textual procedure terminology. If an extracted textual procedure terminology contains a percentage of terms that are similar to the standard list of terms, then $Sim_D=1$ and the routine proceeds to step 40. Similarly, if the extracted target terminology contains a percentage of the terms that are similar to the standard list of terms, but does not contain the standard code, then $Sim_D=1$ and the routine also proceeds to step 40.

In step 40, the extracted textual procedure terminology in the service document is flagged for revision. A respective person responsible for editing the service procedure will receive the identified document with the flagged extracted textual procedure terminology and will modify the document so that the extracted textual procedure terminology recites the proper terminology representation.

While certain embodiments of the present invention have been described in detail, those familiar with the art to which this invention relates will recognize various alternative designs and embodiments for practicing the invention as defined by the following claims.

What is claimed is:

1. A method of correcting service manual textual inconsistencies comprising:
    extracting textual procedures from service documents stored in a memory of a service document storage device;
    comparing each term of an extracted textual procedure terminology to a correlating target name terminology for identifying any matching terms by a processor;
    computing an overlap similarity as a function of the identified matching terms from the extracted textual procedure terminology and the correlating target name terminology;
    determining whether the overlap similarity is greater than a predetermined similarity threshold; and
    modifying the service documents to change the extracted textual procedure terminology to the correlating target name terminology in response to the overlap similarity being greater than the predetermined similarity threshold and the extracted textual procedure terminology not exactly matching the correlating target name terminology.

2. The method of claim 1 comprising:
    checking a domain similarity for determining whether the extracted textual procedure terminology conforms to a standard naming convention in response to the overlap similarity being less than the predetermined similarity threshold;
    comparing the extracted textual procedure terminology to a standard list of name terminology;
    identifying missing terminology in the extracted textual procedure terminology;
    modifying the service documents to include the identified missing terminology in the extracted textual procedure terminology.

3. The method of claim 2 wherein modifying the service documents to include the identified missing terminology includes adding a part code identifier to the extracted textual procedure terminology.

4. The method of claim 2 wherein modifying the service documents to include the identified missing terminology includes adding at least one term to the extracted textual procedure terminology.

5. The method of claim 1 further comprising removing stop words from the extracted textual procedure terminology prior to comparing the term in the extracted textual procedure terminology to a correlating target name terminology.

6. The method of claim 1 further comprising converting abbreviated words in the extracted part name terminology to an expanded form prior to comparing the term in the extracted textual procedure terminology to a correlating target name terminology.

7. The method of claim 1 further comprising converting acronyms in the extracted textual procedure terminology to an expanded form prior to comparing the term in the extracted textual procedure terminology to a correlating target name terminology.

8. The method of claim 1 wherein the overlap similarity is represented by the following formula:

$$Sim_O = \frac{|T \cap C|}{\text{Max}|T||C|}$$

where T includes the target terminology representation of the textual procedure terminology, C includes the textual procedure terminology from the service documents, T∩C is an overlap of terms between the target terminology representation and the textual procedure terminology, and Max|T||C| is the maximum number of matching terms possible between the target terminology representation and the textual procedure terminology.

9. The method of claim 8 wherein the predetermined similarity threshold is 0.75.

10. The method of claim 1 wherein the textual procedure terminology stored in the memory of the service document database device is formatted for parsing textual procedure terminology.

11. The method of claim 10 wherein the textual procedure terminology is formatted in an Excel format.

12. The method of claim 1 wherein the textual procedure terminology is extracted as a function of part names.

13. The method of claim 1 wherein the textual procedure terminology is extracted as a function of component names.

14. The method of claim 1 wherein the textual procedure terminology is extracted as a function of diagnostic trouble codes and description identifiers.

15. The method of claim 1 wherein the part name terminology is extracted as a function of fastener name identifiers.

16. The method of claim 1 wherein a lexical similarity index is determined and assigned to each of the extracted textual procedure terminology, wherein the lexical similarity index is flagged as a same part for each respective textual procedure terminology that matches the target name terminology.

17. The method of claim 1 wherein the lexical similarity index is flagged as a different part for each respective textual procedure terminology that does not match the target name terminology.

18. A service document detection system for correcting textual inconsistencies in service documents comprising:
    a memory storage device for storing part name data relating to service documents;
    a processor for extracting textual procedure terminology from service documents in the memory storage device, the processor comparing each term in the extracted textual procedure terminology to a correlating target name terminology for identifying any matching terms, the processor computing an overlap similarity as a function of the identified matching terms from the extracted textual procedure terminology and the correlating target name terminology, the processor determining whether the overlap similarity is greater than a predetermined similarity threshold;
    wherein a modification is made to the service documents to change the extracted textual procedure terminology to the correlating target name terminology in response to the overlap similarity being greater than the predetermined similarity threshold and the extracted textual procedure terminology not exactly matching the correlating target name terminology.

19. The system of claim 18 wherein the processor checks a domain similarity in response to the overlap similarity being less than the predetermined similarity threshold, wherein the processor compares the extracted textual procedure terminology to a standard list of name terminology, wherein missing terminology in the extracted textual procedure terminology is identified by the processor, and wherein service documents are modified to change the extracted textual procedure terminology to the correlating target name terminology.

\* \* \* \* \*